United States Patent
Zhang

(10) Patent No.: US 11,249,780 B2
(45) Date of Patent: Feb. 15, 2022

(54) VM CREATION BY INSTALLATION MEDIA PROBE

(71) Applicant: Citrix Systems, Inc., Fort Lauderdale, FL (US)

(72) Inventor: Cheng Zhang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/875,414

(22) Filed: Jan. 19, 2018

(65) Prior Publication Data

US 2019/0227828 A1    Jul. 25, 2019

(51) Int. Cl.
*G06F 8/61*          (2018.01)
*G06F 9/455*         (2018.01)

(52) U.S. Cl.
CPC ............ *G06F 9/45558* (2013.01); *G06F 8/63* (2013.01); *G06F 9/4555* (2013.01); *G06F 2009/45562* (2013.01); *G06F 2009/45575* (2013.01)

(58) Field of Classification Search
CPC ....... G06F 8/63; G06F 9/45558; G06F 9/4555
USPC ........................................................ 717/174
See application file for complete search history.

(56) References Cited

U.S. PATENT DOCUMENTS

| 6,813,708 B2 * | 11/2004 | Smith et al. .......... G06F 9/4416 717/174 |
| 9,197,489 B1 * | 11/2015 | Vincent ............... G06F 9/45558 |
| 2005/0066325 A1 * | 3/2005 | Mori et al. ................ G06F 8/61 717/174 |
| 2011/0004878 A1 * | 1/2011 | Devoux .............. G06F 9/45558 718/1 |
| 2016/0132351 A1 * | 5/2016 | Kashyap et al. .... G06F 9/45558 718/1 |
| 2016/0239321 A1 * | 8/2016 | Dong et al. ......... G06F 9/45558 |

* cited by examiner

*Primary Examiner* — Wei Y Zhen
*Assistant Examiner* — Mohammed N Huda
(74) *Attorney, Agent, or Firm* — Foley & Lardner LLP

(57) ABSTRACT

Described embodiments provide systems and methods for running virtual machines based by probing installation media. A media probe executing on one or more processors may identify an installation media for configuring a virtual machine on a type of operating system. The media probe may detect the type of operating system from the installation media. A virtualization manager executing on the one or more processors may determine a virtualization mode for configuration of the virtual machine based on the type of operating system detected from the installation media. The virtualization manager may create the virtual machine in accordance with the virtualization mode determined based on the type of operating system.

14 Claims, 4 Drawing Sheets

VM CREATION BY INSTALLATION MEDIA PROBE

FIELD OF THE DISCLOSURE

The present application generally relates to creating virtual machines. In particular, the present application relates to systems and methods for running virtual machine by probing installation media.

BACKGROUND

Multiple virtual machines may execute on a single host physical computer, allowing each virtual machine to behave as if the virtual machine were a separate physical computer with distinct portions of the hardware of the host computer. Templates may be used to encapsulate virtual machines. Each template may contain setup information specifying various parameters for deploying new virtual machines across different physical computers. Certain templates, however, may be compatible with particular hardware and/or software-related configurations, while other templates may be compatible with other configurations. Moreover, it may be difficult and perplexing for end users to navigate an assortment of templates to create and deploy a properly functioning virtual machine.

BRIEF SUMMARY

The present disclosure is directed towards systems and methods for running virtual machines by probing installation media. Virtual machines may be maintained in a virtualized computing environment hosted across one or more servers on behalf of clients accessing services from the environment. To request a creation of a virtual machine, an end user of a client may be provided with a graphical user interface listing a variety of templates to select from. Each template may correspond to a virtual disk encapsulating setup information for a virtual machine. The templates may contain installation metadata specifying an operating system, memory, processor, network configurations, and other parameters for creating the virtual machine. Upon receipt of the selection of one of the templates, the one or more servers hosting the virtualized computing environment may mount the virtual disk corresponding to the selected template. Using the installation metadata parsed from the template, the host servers may create in accordance to the extracted setup information and run the virtual machine corresponding to the selected template. Once running, the virtual machine may provide various associated services to the client that made the request.

Setting up virtual machines using templates selected by the end user under this schema may result in suboptimal configurations of the virtualized environment. The templates may differ from one another in the operating system, memory, processor, network configurations specifications. As a result, certain virtual disks of some templates may be compatible with some host servers, whereas other virtual disks of other templates may not be compatible (e.g., due to hardware and application settings). Mounting an incompatible virtual disk onto the host server may lead to the inoperability of some of the features for the virtual machine or the virtual machine itself. Furthermore, the end users attempting to access resources from the virtualized computing environment may sort through the list of templates for creating the virtual machine. The installation process of one templates may appear similar to the setup process of another template, although the two templates may contain different installation metadata. As such, the selection of the template from the graphical user interface may also be daunting or perplexing for some end user. Moreover, a selection of an incompatible template may also lead to inoperability of the virtual machine in whole or in part.

To resolve issues arising from improper selection of templates to create virtual disks, the present systems and methods provide creation and running of virtual machines based on probing of installation media. A probe of a virtualized computing environment may first scan an installation media to identify a type of operating system. For detecting a Windows™ operating system from the installation media, the probe may find an image disk file corresponding to the installation media at a predefined file pathname (e.g., "source/install.esd" or "source/install.wim"). The probe may then identify the type of operating system by executing a query command on the image disk file to extract the metadata (e.g., :dism/Get-WimInfo/WimFile: F:\sources\install.wim/index:1" or "dism/Get-WimInfo/ WimFile:F:\sources\install.esd/index:1"). For detecting a Linux™ operating system from the installation media, the probe may find a software package file corresponding to the installation media at pre-specified location (e.g., "/etc/red-hat-release", "/etc/os-release", or "/etc/lsb-release"). The probe may then extract and identify the type of operating system from the software package file.

Based on the identified type of operating system, a virtualization manager may determine virtualization modes for creating the virtual machine using the installation media. The virtualization modes may, for example, include a hardware-assisted virtualization mode (also referred to as hardware virtual machine (HVM)), a hardware-assisted virtualization mode with para-virtualized drivers (PVHVM), or para-virtualization mode (PVM), among others. Certain types of operating systems may support different virtualization modes. The virtualization manager may also identify minimum hardware settings, such as minimum processor, disk, memory, and network configurations, for creating and running the virtual machines with the virtualization modes. The virtualization manager may also identify the hardware settings of the servers hosting the virtualized computing environment.

With the identification of the virtualization modes and the associated minimum hardware settings for creating the virtual machines, the virtualization manager may provide a graphical user interface for presentation to an end user of a client to configure a virtual machine. The graphical user interface may list virtualization modes for the supported types of operating systems detected from the installation media and the associated minimum hardware settings for each virtualization mode. The graphical user interface may also allow the end user to select a higher hardware setting than the minimum hardware settings to run the virtual machine. In some embodiments, the graphical user interface may also list types of operating systems other than those detected from the installation media, together with a description that non-supported types of operating systems are to be run on a different virtualization platform. Upon selecting one of the virtualization mode for supported types of operating systems from the interface and the hardware settings for the virtualization mode, the virtualization manager may identify the proper host server and may create and run the virtual machine thereon in accordance with the selection.

By determining which virtualization modes are supported from the types of operating systems on installation media for running virtual machines, the chances of mounting an incompatible virtual disk onto the host server may be decreased or eliminated. In addition, by denoting which virtualization modes are supported on the graphical user interface presented to the end user, the addition or removal of supported virtual machines may become transport to the end user. Furthermore, the perplexity of the graphical user interface for requesting resources from the virtualized computing environment may be reduced and the likelihood of improper selection may be diminished.

At least one aspect of this disclosure is directed to a method of running virtual machines by probing installation media. A media probe executing on one or more processors may identify an installation media for configuring a virtual machine on a type of operating system. The media probe may detect the type of operating system from the installation media. A virtualization manager executing on the one or more processors may determine a virtualization mode for configuration of the virtual machine based on the type of operating system detected from the installation media. The virtualization manager may create the virtual machine in accordance with the virtualization mode determined based on the type of operating system.

In some embodiments, identifying the installation media may include identifying a disk image file corresponding to the installation media. In some embodiments, detecting the type of operating system may include retrieving metadata specifying the type of operating system from the disk image file.

In some embodiments, identifying the installation media may include identifying a release package including the installation media. In some embodiments, detecting the type of operating system may include finding an operating system identification file in the release package, the operating system identification file specifying the type of operating system for the release package. In some embodiments, creating the virtual machine may include mounting the installation media for the virtual machine in accordance with the virtualization mode determined based on the type of operating system.

In some embodiments, the virtualization manager may identify a minimum hardware setting for configuration of the virtual machine in accordance with the virtualization mode based on the type of operating system. In some embodiments, creating the virtual machine may include creating the virtual machine in accordance with the virtualization mode using at least the minimum hardware setting.

In some embodiments, the virtualization manager may identify a minimum hardware setting for configuration of the virtual machine in accordance with the virtualization mode. In some embodiments, the virtualization manager may provide a graphical user interface for selecting one of a plurality of hardware settings for configuration of the virtual machines. The plurality of hardware settings may include a first setting corresponding to the minimum hardware setting and a second setting greater than the minimum hardware setting. In some embodiments, the virtualization manager may receive the selection of one of the plurality of hardware settings from the graphical user interface for configuration of the virtual machine. In some embodiments, the virtualization manager may receive the selection of one of the plurality of hardware settings from the graphical user interface for configuration of the virtual machine.

In some embodiments, determining the virtualization mode may include determining a plurality of virtualization modes for configuration of the virtual machine based on the type of operating system. In some embodiments, the virtualization manager may provide a graphical user interface for selecting the virtualization mode from the plurality of virtualization modes. In some embodiments, the virtualization manager may receive the selection of the virtualization mode from the graphical user interface for configuration of the virtual machine.

In some embodiments, the virtualization manager may provide a graphical user interface listing for selecting the virtualization mode from a plurality of virtualization modes. The plurality of virtualization modes may include a first virtualization mode supported by the type of operating system and a second virtualization mode not supporting the type of operating system detected from the installation media. In some embodiments, the virtualization manager may receive the selection of the first virtualization mode from the graphical user interface for configuration of the virtual machine.

In some embodiments, virtual machine may be a first virtual machine. In some embodiments, the virtualization manager may provide a graphical user interface for selecting the virtualization mode from a plurality of virtualization modes. The plurality of virtualization modes may include a first virtualization mode supported by the type of operating system and a second virtualization mode not supporting the type of operating system detected from the installation media. In some embodiments, the virtualization manager may receive a selection of the second virtualization mode from the graphical user interface. In some embodiments, the virtualization manager may send the selection of the second virtualization mode to a virtualization service to establish a second virtual machine separate from the first virtual machine. In some embodiments, determining the virtualization may include determining a plurality of virtualization modes for configuration of the virtual machine based on the type of operating system, the plurality of virtualization modes including a hardware-assisted virtualization mode and a para-virtualization mode Another aspect of this disclosure is directed to a system for running virtual machines by probing installation media. The system may include a media probe executable on one or more processors. The media probe may identify an installation media for configuring a virtual machine on a type of operating system. The media probe may detect the type of operating system from the installation media. The system may include a virtualization manager executable on the one or more processors. The virtualization manager may determine a virtualization mode for configuration of the virtual machine based on the type of operating system detected from the installation media. The virtualization manager may create the virtual machine in accordance with the virtualization mode determined based on the type of operating system.

In some embodiments, the media probe may identify the installation media by identifying a disk image file corresponding to the installation media. In some embodiments, the media probe may detect the type of operating system by retrieving metadata specifying the type of operating system from the disk image file.

In some embodiments, the media probe may identify the installation media by identifying a release package including the installation media. some embodiments, the media probe may detect the type of operating system by finding an operating system identification file in the release package, the operating system identification file specifying the type of operating system for the release package. In some embodiments, the virtualization manager may create the virtual machine by mounting installation media for the virtual machine in accordance with the virtualization mode determined based on the type of operating system.

In some embodiments, the virtualization manager may identify a minimum hardware setting for configuration of the virtual machine in accordance with the virtualization mode based on the type of operating system. In some embodiments, the virtualization manager may create the virtual machine in accordance with the virtualization mode using at least the minimum hardware setting.

In some embodiments, the virtualization manager may identify a minimum hardware setting for configuration of the virtual machine in accordance with the virtualization mode. In some embodiments, the virtualization manager may provide a graphical user interface for selecting one of a plurality of hardware settings for configuration of the virtual machines. The plurality of hardware settings may include a first setting corresponding to the minimum hardware setting and a second setting greater than the minimum hardware setting. In some embodiments, the virtualization manager may receive the selection of one of the plurality of hardware settings from the graphical user interface for configuration of the virtual machine.

In some embodiments, the virtualization manager may determine a plurality of virtualization modes for configuration of the virtual machine based on the type of operating system. In some embodiments, the virtualization manager may provide a graphical user interface for selecting the virtualization mode from the plurality of virtualization modes. In some embodiments, the virtualization manager may receive the selection of the virtualization mode from the graphical user interface for configuration of the virtual machine.

In some embodiments, the virtualization manager may provide a graphical user interface for selecting the virtualization mode from a plurality of virtualization modes. The plurality of virtualization modes may include a first virtualization mode supported by the type of operating system and a second virtualization mode not supporting the type of operating system detected from the installation media. In some embodiments, the virtualization manager may receive a selection of the second virtualization mode from the graphical user interface. In some embodiments, the virtualization manager may send the selection of the second virtualization mode to a virtualization service to establish a second virtual machine separate from the first virtual machine.

In some embodiments, the virtual machine may be a first virtual machine. In some embodiments, the virtualization manager may provide a graphical user interface for selecting the virtualization mode from a plurality of virtualization modes. The plurality of virtualization modes may include a first virtualization mode supported by the type of operating system and a second virtualization mode not supporting the type of operating system detected from the installation media. In some embodiments, the virtualization manager may receive a selection of the second virtualization mode from the graphical user interface. In some embodiments, the virtualization manager may send the selection of the second virtualization mode to a virtualization service to establish a second virtual machine separate from the first virtual machine. In some embodiments, the virtualization manager may determine plurality of virtualization modes for configuration of the virtual machine based on the type of operating system, the plurality of virtualization modes including a hardware-assisted virtualization mode and a para-virtualization mode.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
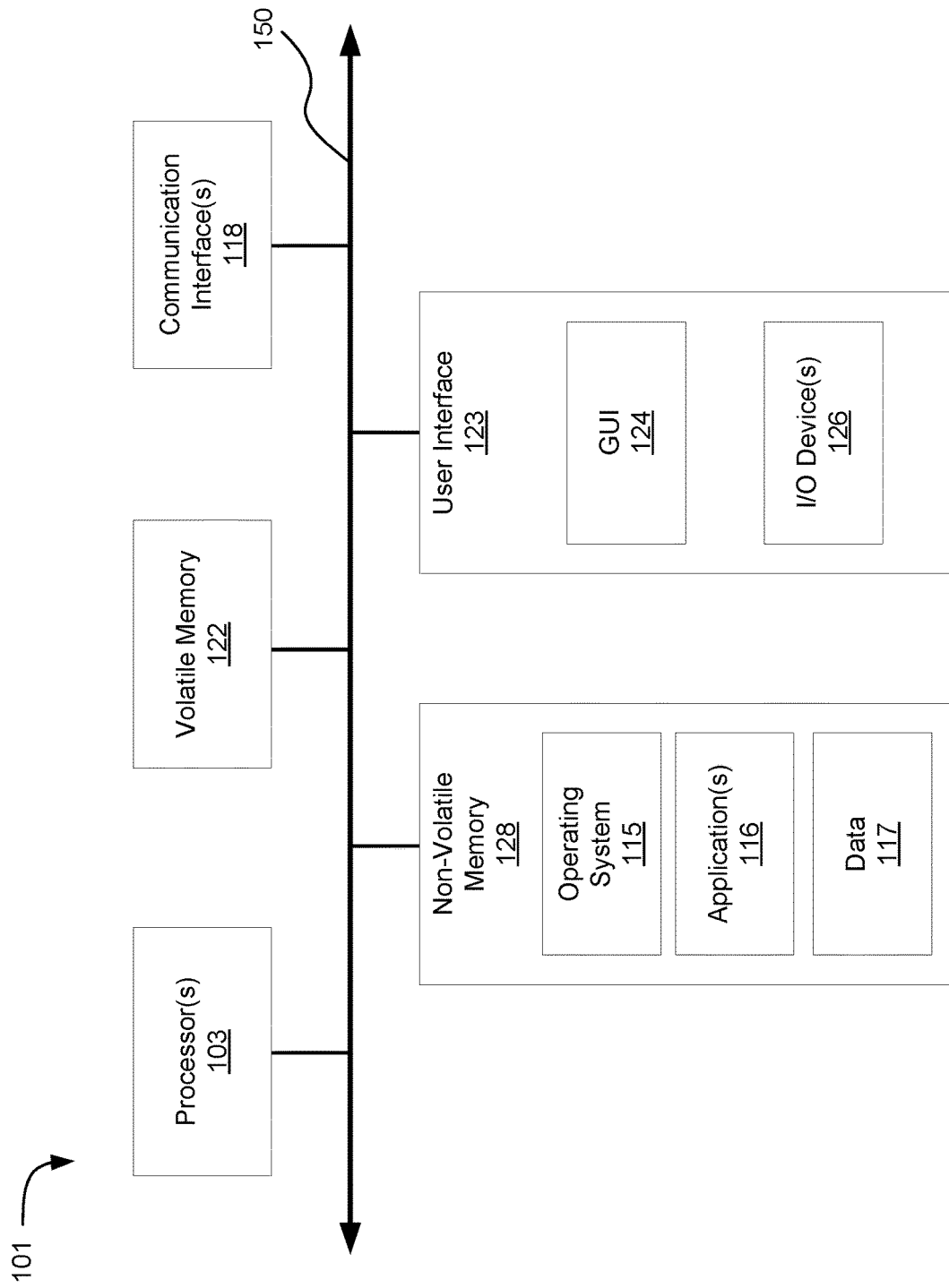
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes a virtualized computing environment which may be useful for practicing embodiments described herein; and Section C describes systems and methods for running virtual machines by probing installation media.

A. Computing Environment

Prior to discussing the specifics of embodiments of the systems and methods for running virtual machines by probing installation media, it may be helpful to discuss the computing environments in which such embodiments may be deployed.

As shown in FIG. 1, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1 is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, the computing device 101 may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Virtualized Computing Environment

Prior to discussing the specifics of embodiments of the systems and methods for running virtual machines by probing installation media, it may be also helpful to discuss the virtualized computing environments in which such embodiments may be deployed.

Figure 2:
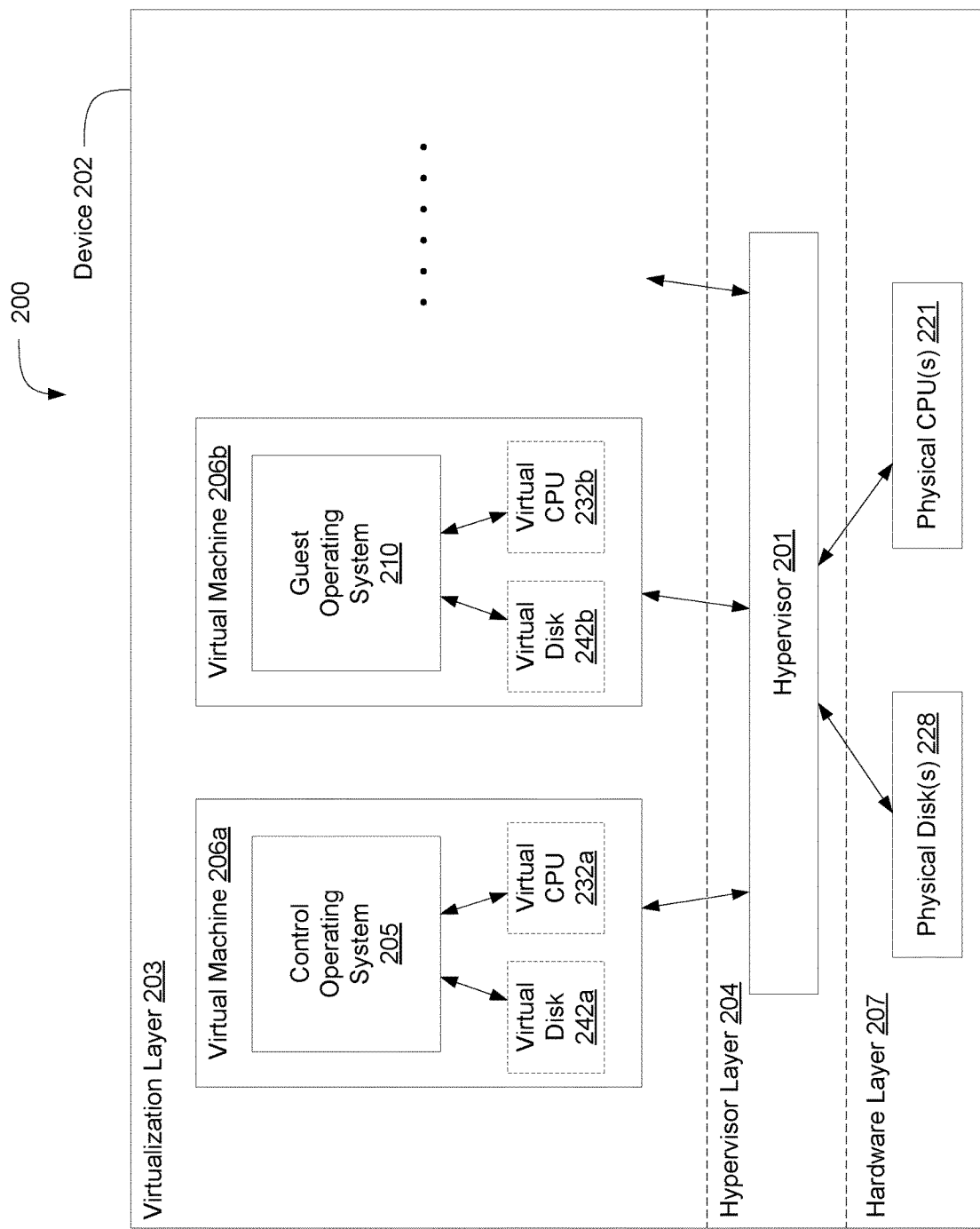
FIG. 2 is a block diagram of embodiments of a virtualized computing device.

Referring now to FIG. 2, a block diagram of a virtualized environment 200 is shown. As shown, a computing device 202 in virtualized environment 200 includes a virtualization layer 203, a hypervisor layer 204, and a hardware layer 207. Hypervisor layer 204 includes one or more hypervisors (or virtualization managers) 201 that allocates and manages access to a number of physical resources in hardware layer 207 (e.g., physical processor(s) 221 and physical disk(s) 228) by at least one virtual machine (VM) (e.g., one of VMs 206) executing in virtualization layer 203. Each VM 206 may include allocated virtual resources such as virtual processors 232 and/or virtual disks 242, as well as virtual resources such as virtual memory and virtual network interfaces. In some embodiments, at least one of VMs 206 may include a control operating system (e.g., 205) in communication with hypervisor 201 and used to execute applications for managing and configuring other VMs (e.g., guest operating systems 210) on device 202.

In general, hypervisor(s) 201 may provide virtual resources to an operating system of VMs 206 in any manner that simulates the operating system having access to a physical device. Thus, hypervisor(s) 201 may be used to emulate virtual hardware, partition physical hardware, virtualize physical hardware, and execute virtual machines that provide access to computing environments. In an illustrative embodiment, hypervisor(s) 201 may be implemented as a XEN hypervisor, for example as provided by the open source Xen.org community. In an illustrative embodiment, device 202 executing a hypervisor that creates a virtual machine platform on which guest operating systems may execute is referred to as a host server. In such an embodiment, device 202 may be implemented as a XEN server as provided by Citrix Systems, Inc., of Fort Lauderdale, Fla.

Hypervisor 201 may create one or more VMs 206 in which an operating system (e.g., control operating system 205 and/or guest operating system 210) executes. For example, the hypervisor 201 loads a virtual machine image to create VMs 206 to execute an operating system. Hypervisor 201 may present VMs 206 with an abstraction of hardware layer 207, and/or may control how physical capabilities of hardware layer 207 are presented to VMs 206. For example, hypervisor(s) 201 may manage a pool of resources distributed across multiple physical computing devices.

In some embodiments, one of VMs 206 (e.g., the VM executing control operating system 205) may manage and configure other of VMs 206, for example by managing the execution and/or termination of a VM and/or managing allocation of virtual resources to a VM. In various embodiments, VMs may communicate with hypervisor(s) 201 and/or other VMs via, for example, one or more Application Programming Interfaces (APIs), shared memory, and/or other techniques.

In general, VMs 206 may provide a user of device 202 with access to resources within virtualized computing environment 200, for example, one or more programs, applications, documents, files, desktop and/or computing environments, or other resources. In some embodiments, VMs 206 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 2 as including a single virtualized device 202, virtualized environment 200 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 200 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Deploying Software Updates to Multiple Clients

The present disclosure is directed towards systems and methods for running virtual machines by probing installation media. Virtual machines may be maintained in a virtualized computing environment hosted across one or more servers on behalf of clients accessing services from the environment. To request a creation of a virtual machine, an end user of a client may be provided with a graphical user interface listing a variety of templates to select from. Each template may correspond to a virtual disk encapsulating setup information for a virtual machine. The templates may contain installation metadata specifying an operating system, memory, processor, network configurations, and other parameters for creating the virtual machine. Upon receipt of the selection of one of the templates, the one or more servers hosting the virtualized computing environment may mount the virtual disk corresponding to the selected template. Using the installation metadata parsed from the template, the host servers may create in accordance to the extracted setup information and run the virtual machine corresponding to the selected template. Once running, the virtual machine may provide various associated services to the client that made the request.

Setting up virtual machines using templates selected by the end user under this schema may result in suboptimal configurations of the virtualized environment. The templates may differ from one another in the operating system, memory, processor, network configurations specifications. As a result, certain virtual disks of some templates may be compatible with some host servers, whereas other virtual disks of other templates may not be compatible (e.g., due to hardware and application settings). Mounting an incompatible virtual disk onto the host server may lead to the inoperability of some of the features for the virtual machine or the virtual machine itself. Furthermore, the end users attempting to access resources from the virtualized computing environment may sort through the list of templates for creating the virtual machine. The installation process of one templates may appear similar to the setup process of another template, although the two templates may contain different installation metadata. As such, the selection of the template from the graphical user interface may also be daunting or perplexing for some end user. Moreover, a selection of an incompatible template may also lead to inoperability of the virtual machine in whole or in part.

To resolve issues arising from improper selection of templates to create virtual disks, the present systems and methods provide creation and running of virtual machines based on probing of installation media. A probe of a virtualized computing environment may first scan an installation media to identify a type of operating system. For detecting a Windows™ operating system from the installation media, the probe may find an image disk file corresponding to the installation media at a predefined file pathname (e.g., "source/install.esd" or "source/install.wim"). The probe may then identify the type of operating system by executing a query command on the image disk file to extract the metadata (e.g., :dism/Get-WimInfo/WimFile:F:\sources\install.wim/index:1" or "dism/Get-WimInfo/WimFile:F:\sources\install.esd/index:1"). For detecting a Linux™ operating system from the installation media, the probe may find a software package file corresponding to the installation media at pre-specified location (e.g., "/etc/redhat-release", "/etc/os-release", or "/etc/lsb-release"). The probe may then extract and identify the type of operating system from the software package file.

Based on the identified type of operating system, a virtualization manager may determine virtualization modes for creating the virtual machine using the installation media. The virtualization modes may, for example, include a hardware-assisted virtualization mode (also referred to as hardware virtual machine (HVM)), a hardware-assisted virtualization mode with para-virtualized drivers (PVHVM), or para-virtualization mode (PVM), among others. Certain types of operating systems may support different virtualization modes. The virtualization manager may also identify minimum hardware settings, such as minimum processor, disk, memory, and network configurations, for creating and running the virtual machines with the virtualization modes. The virtualization manager may also identify the hardware settings of the servers hosting the virtualized computing environment.

With the identification of the virtualization modes and the associated minimum hardware settings for creating the virtual machines, the virtualization manager may provide a graphical user interface for presentation to an end user of a client to configure a virtual machine. The graphical user interface may list virtualization modes for the supported types of operating systems detected from the installation media and the associated minimum hardware settings for each virtualization mode. The graphical user interface may also allow the end user to select a higher hardware setting than the minimum hardware settings to run the virtual machine. In some embodiments, the graphical user interface may also list types of operating systems other than those detected from the installation media, together with a description that non-supported types of operating systems are to be run on a different virtualization platform. Upon selecting one of the virtualization mode for supported types of operating systems from the interface and the hardware settings for the virtualization mode, the virtualization manager may identify the proper host server and may create and run the virtual machine thereon in accordance with the selection.

By determining which virtualization modes are supported from the types of operating systems on installation media for running virtual machines, the chances of mounting an incompatible virtual disk onto the host server may be decreased or eliminated. In addition, by denoting which virtualization modes are supported on the graphical user interface presented to the end user, the addition or removal of supported virtual machines may become transport to the end user. Furthermore, the perplexity of the graphical user interface for requesting resources from the virtualized computing environment may be reduced and the likelihood of improper selection may be diminished.

Figure 3A:
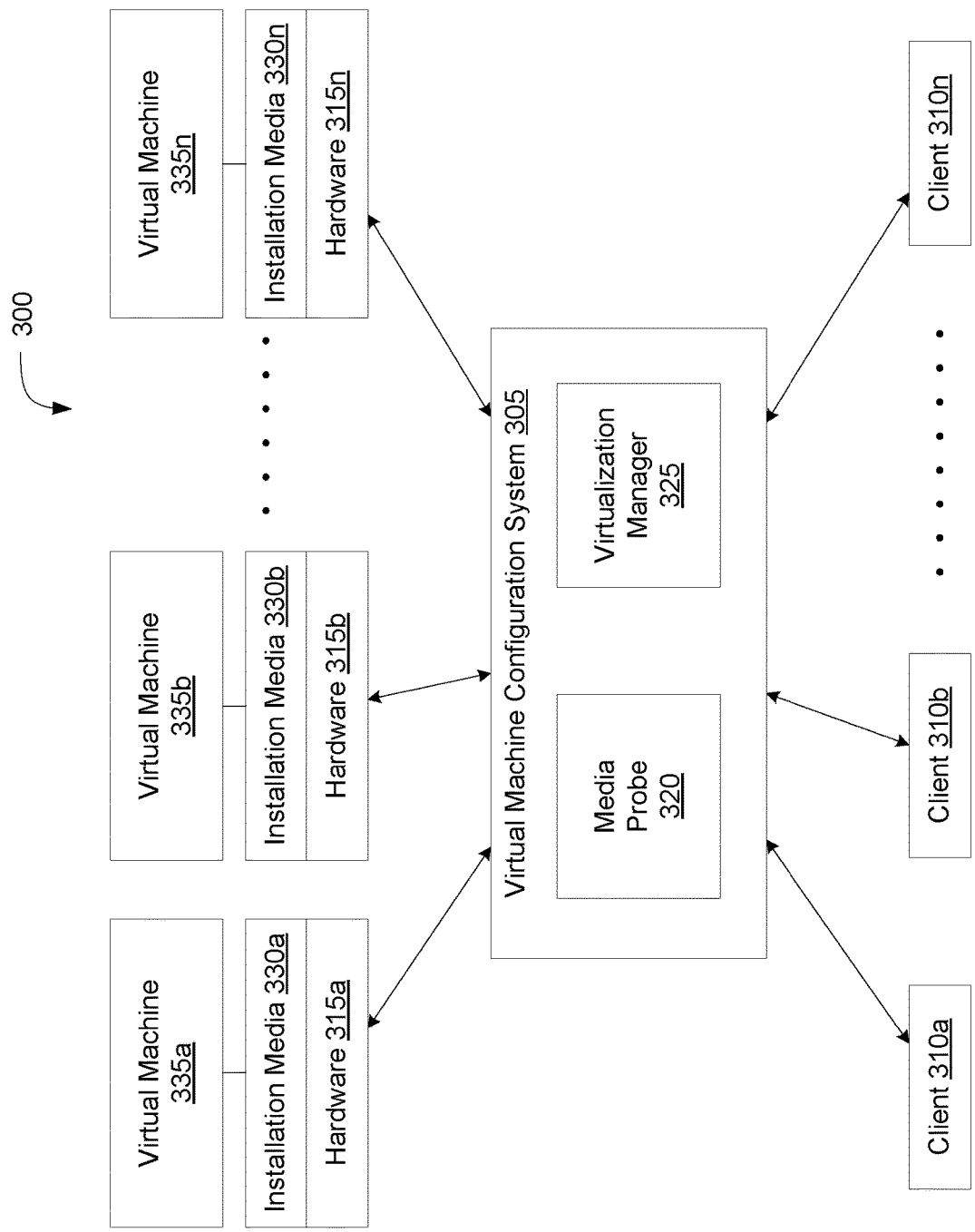
FIG. 3A is a block diagram of an embodiment of a system for running virtual machines by probing installation media.

Referring now to FIG. 3A, depicted is a block diagram of an embodiment of a system 300 for running virtual machines by probing installation media. In overview, the system 300 may include a virtual machine configuration system 305, one or more clients 310a-n (hereinafter generally referred to as client 310), and one or more hardware units 315a-n (hereinafter generally referred to as hardware unit 315). The virtual machine configuration system 305 may include a media probe 320 and a virtualization manager 325. Each hardware unit 315 may include installation media 330a-n (hereinafter generally referred to as installation media 330) for supporting one or more virtual machine 335a-n (hereinafter generally referred to as virtual machine 335).

Each of the above-mentioned elements or entities is implemented in hardware, or a combination of hardware and software, in one or more embodiments. Each component of the system 300 may be implemented using hardware or a combination of hardware or software detailed above in connection with FIGS. 1 and 2. For instance, each of these elements or entities can include any application, program, library, script, task, service, process or any type and form of executable instructions executing on hardware of the virtual machine configuration system 305, such as the media probe 320 and the virtualization manager 325. The hardware includes circuitry such as one or more processors in one or more embodiments.

In the context of the virtualized environment 200 described in FIG. 2, the virtual machine configuration system 305 along with the media probe 305 and the virtualization manager 325 may reside on the hypervisor layer 204 between the virtualization layer 203 and the hardware layer 207. In some embodiments, the virtual machine configuration system 305 may be a part of the hypervisor 201. In some embodiments, the virtual machine configuration system 305 may be the virtualized device 202 itself, and may also include the hardware units 315 with installation media 330 for supporting one or more virtual machines 335. Each hardware unit 315 may be a part of the hardware layer 207 below the virtualization layer 203 and the hypervisor layer 204. The hardware units 315 may include physical resources in the hardware layer 207, such as the physical processor(s) 221 and the physical disk(s) 228. In some embodiments, each hardware unit 315 may correspond to a host server for running one or more of the virtual machines 235. Each installation media 330 may be a part of the hardware layer 207. The installation media 330 may be a part of the physical resources in the hardware layer 207, and may be stored on one of the physical disk(s) 228. Each virtual machine 335 instantiated by the virtual machine configuration system 305 may correspond to one of the virtual machines 206 residing in the virtualization layer 203 above the hypervisor layer 204 and the hardware layer 207. The virtual machine 335 may include allocated virtual resources, such as virtual processors 232, virtual disks 243, virtual memory, and/or virtual network interfaces. The virtual machine 335 may also run an operating system corresponding to the control operating system 205 or the guest operating system 210. The client(s) 310 may reside outside the virtualized environment 200, but may access resources hosted therein.

In the system 300, the client 310 may first send a request for virtualized resources to the virtual machine configuration system 305 to access resources hosted on the virtualized environment 200. The request may include an account identifier and access code for an end user of the client 310. Upon receipt of the request from the client 310, the virtual machine configuration system 305 may parse request to identify the account identifier and access code. Once the account identifier is successfully authenticated using the access code, the virtual machine configure system 305 may provide a list of supported virtual machines for the end user of the client 310 to select. The determination of which virtual machines hosted in the virtualized environment 200 are available to the client 310 are detailed herein below with the functionality of the media probe 320 and the virtualization manager 325 of the virtual machine configuration system 305.

To determine which resources hosted in the virtualized environment 200 are available, the media probe 320 may identify the installation media 330 for configuring the virtual machine 335 on a type of operating system. The installation media 330 may include setup data for installing an operating system for operation on the virtual machine 335. In some embodiments, the media probe 320 may access each hardware unit 315 to identify the corresponding installation media 330. As discussed above, the installation media 330 may reside on a storage of the hardware unit 315, such as on the physical disk(s) 228. In some embodiments, the media probe 320 may access the storage of the hardware unit 315 to identify one or more files corresponding to the installation media 330 at a predefined location. The predefined location may be specified by a file pathname. The file pathname may include a host drive, directory, file base name, and a filename extension, among others. For example, the predefined location of the one or more files corresponding to the installation media 330 may be "X:\source\install.esd" or "F:\source\install.wim" for Windows™. The predefined location "/etc/rehat-release", "/etc/os-release", or "/etc/lsb-release" for various Linux™-based operating systems.

In some embodiments, the media probe 320 may search one or more files in storage in the hardware unit 315 (e.g., stored on the physical disk(s) 228) to find the installation media 330. For each file, the media probe 320 may identify the filename extension. The media probe 320 may compare the filename extension to a list of extensions corresponding to known or pre-specified installation media 330, such as a disk image file (e.g., ".iso", ".esd", ".wim", ".dmg", ".smi", or "img") or a set of release package files (e.g., ".rpm" or ".msi"), among others. If there is no match with any of the list of extensions, the media probe 320 may continue to search the hardware unit 315 for the installation media 330. If there is match with one of the list of extensions, the media probe 320 may identify the file as the installation media 330. In some embodiments, the media probe 320 may also traverse the storage of the hardware unit 315 to find one or more associated files associated with the installation media 330 (e.g., a configuration or specification (SPEC) file). In some embodiments, the additional files may be included in the same directory or sub-directories as the file for the installation media 330.

Having identified the installation media 330 on the hardware unit 325, the probe media 320 may detect the type of operating system from and/or within the installation media 330. The type of operating system may include any version of Microsoft Windows™ (e.g., Windows 7™, Windows 10™, Windows XP™, Windows 8.1™, or Windows 8™), any type of Linux™ kernels (e.g., Ubuntu™, Red Hat™, Kylin™, Debia™, Mint™, Fedora™, Linux Mint™, Oracle Linux™, Android™, Chrome OS™, or Chromium OS™), and Macintosh™ operating systems (e.g., macOS™), among others. By detecting the type of operating system on the installation media 330 stored in the hardware unit 315, the virtual machine configuration system 305 may determine which virtual machines and associated virtualization modes are compatible with the hardware unit 315.

In some embodiments, the media probe 320 may execute a disk imaging service (e.g., Deployment Image Servicing and Management ("DISM")) on the file corresponding to installation media 330 to identify the type of operating system therein. The file corresponding to the installation media 330 may include the disk image file (e.g., "install.wim" or "install.esd") described above. By running the disk imaging service, the media probe 320 may extract metadata from the installation media 330. The media probe 320 may retrieve or receive an output the extracted metadata from the disk imaging service. The media probe 320 may then parse the output from the disk imaging service to identify the type of operating system. For example, for Windows™-based operating systems, the media probe 320 may execute the command "dism/Get-WimInfo/WimFile:F:\sources \install.wim/index:1" or "dism/Get-WimInfo/WimFile: F:\sources \install.esd/index:1". In this example, by parsing the output of the command, the media probe 320 may identify which version of Windows™ is included within the installation media 330.

In some embodiments, the media probe 320 may parse the file corresponding to the installation media 330 to identify the type of operating system. The to-be parsed file corresponding to the installation media 330 may include the set of release package files (e.g., file with extension ".rpm") described above. In some embodiments, the media probe 320 may extract one or more files from the set of release package files to identify the type of operating system. The one or more associated files may also be identified by the media probe 230 from traversing the storage of the hardware unit 315. The one or more associated files may include an operating system identification file (e.g., a configuration or specification file) included or associated with the set of release package files. The operating system identification file may specify the type of operating system for the release package, along with other installation metadata. In some embodiments, the media probe 320 may parse the operating system identification file to identify the type of operating system. In some embodiments, the media probe 320 may execute a package parsing service to identify the type of operating system from the set of release package files. For example, for Linux™-based operating systems, the media probe 320 may execute an "rpmrebuild" command on the operating system identification file within the installation media 330 to extract the metadata. Using the extracted metadata, the media probe 320 may identify the type of operating system for the installation media 330.

The media probe 320 may repeat the above detailed functionality across multiple hardware units 315 of the virtualized environment 200. In some embodiments, the media probe 320 may identify a single type of operating system from one installation media 330 on one hardware unit 315. In some embodiments, the media probe 320 may identify multiple types of operating systems from multiple installation media 320 stored on one hardware unit 315.

Based on the type of operating system from or within the installation media 330, the virtualization manager 325 may determine one or more virtualization modes (sometimes referred to as "domain types") for creating, running, and/or otherwise configuring the virtual machine 335. Each virtualization mode may specify various characteristics of the operations of the virtual machine 335 and/or the hypervisor 201 executing the virtual machine 335 in relation to the physical resources, such as the physical disk(s) 228 and the physical CPU(s) 221. Certain types of operating systems may support specific virtualization modes, whereas other types of operating systems may support other virtualization modes. In addition, certain types of operating systems may rely on particular hardware settings to run different virtualization modes.

The one or more virtualization modes may include a hardware-assisted virtualization mode (also referred to as hardware virtual machine (HVM) or full-virtualization), a hardware-assisted virtualization mode with para-virtualized drivers (also referred to as hardware virtual machine with para-virtualization (PVHVM) or hybrid virtualization), or para-virtualization mode (PVM), among others. In the hardware-assisted virtualization mode, the operating system running on the virtual machine 335 may be unaware that the system is virtualized, and may issue commands to the underlying physical hardware unit 315. In the para-virtualization mode, the operating system running on the virtual machine may be aware that the system is virtualized, and may issue commands translated by a software interface to the underlying physical hardware unit. In the hardware-assisted virtualization mode with para-virtualized drivers, certain features of the operating system running on the virtual machine 335 may rely on para-virtualization while some other features may rely on full-virtualization.

To determine which virtualization modes are supported by the type of operating system of the installation media 330, the virtualization manager 325 may identify one or more capabilities of the type of operating system. The capabilities may include applications, services, function calls, processes, and other processor features that the operating system may call upon. Furthermore, each capability may rely on one or more of the hardware-assisted virtualization mode, the hardware-assisted virtualization mode with para-virtualized drivers, or the para-virtualization mode. Based on the one or more capabilities of the type of operating system, the virtualization manager 325 may then determine which virtualization modes are supported. In some embodiments, the virtualization manager 325 may traverse through the one or more capabilities of the type of operating system to determine which virtualization mode the capability relies on. If all the capabilities of the operating system relies on the hardware-assisted virtualization mode, the type of operating system may be determined to support the hardware-assisted virtualization mode. Based on this determination, the virtualization manager 325 may determine that the hardware-assisted virtualization mode is to be used in creating and running the virtual machine 335 for the type of operating system. If all the capabilities of the operating system relies on the para-virtualization mode, the type of operating system may support the para-virtualization mode. Based on this determination, the virtualization manager 325 may determine that para-virtualization mode is to be used in creating and running the virtual machine 335 for the type of operating system. If some of the capabilities of the operating system relies on full-virtualization and some of the capabilities of the operating system relies on para-virtualization, the type of operating system may support the hardware-assisted virtualization mode with para-virtualized drivers. Based on this determination, the virtualization manager 325 may determine that the hardware-assisted virtualization mode with para-virtualized drivers or the hardware-assisted virtualization mode is to be used in creating and running the virtual machine 335 for the type of operating system.

In some embodiments, the virtualization manager 325 may access a list of supported virtualization modes for the type of operating system to determine which virtualization modes are supported. The list of supported virtualization modes may specify which virtualization modes are supported for each type of operating system. For example, the list may specify that RHEL 7™ may support both the hardware-assisted virtualization mode and the para-virtualization mode. By accessing the list of supported virtualization modes, the virtualization manager 325 may determine the support virtualization modes for the type of operating system identified from the installation media 330. In some embodiments, the virtualization manager 325 may access a list of unsupported virtualization modes for the type of operating system detected in the installation media 310. The unsupported virtualization modes may not be able to run on the hardware units 315 accessible from the virtual machine configuration system 305. Instead, the unsupported virtualization modes may be established on a separate virtualization service as detailed below.

The virtualization manager 325 may also identify a minimum hardware setting for creating, running, or otherwise configuring the virtual machine 335 in accordance with the virtualization mode determined for the type of operating system. The minimum hardware setting may specify hardware configurations at which the hardware unit 315 is to create, run, and/or configure the virtual machine 335 using the type of operating system detected from the installation media 330 in accordance to with the virtualization mode. The minimum hardware setting (also referred to as system prerequisites or requirements) may define minimum processor, memory, storage, network, and other physical resources for creating, running, or otherwise configuring the virtual machine 335 using the type of operating system with the virtualization mode. In some embodiments, the virtualization manager 325 may access a list of minimum hardware settings for each type of operating system. The list of minimum hardware settings may specify processor, memory, storage, network, and other system configurations for creating and running the virtual machine 335 in accordance to each virtualization mode for each type of operating system. For example, the list may specify that the 64-bit processor with 2.2 GHz clock speed, 2 GB of memory, 8 GB of disk space to run Windows 7™ using the para-virtualization mode. In some embodiments, the list of minimum hardware settings may additionally specify a recommend hardware setting for creating and running the virtual machine 335 in accordance to the virtualization modes for the types of operating systems. The recommended hardware setting may be higher in processor, memory, storage, network, and other system configurations than the minimum hardware setting.

In some embodiments, the virtualization manager 325 may identify a hardware setting for each hardware unit 315 including the installation media 330 corresponding to the operating system for the virtual machine 335. The hardware settings for the hardware unit 315 may include processor, memory, storage, network, and other physical resources available for creating, running, or otherwise configuring the virtual machine 335. In some embodiments, the virtualization manager 325 may access one or more device drivers on the storage of the hardware unit 315. Each device driver may specify the associated physical resource, such as the processor, the memory, the storage, and the network resources, among others. Each device driver may also indicate available physical resources. By accessing each device driver, the virtualization manager 324 may identify the hardware setting for the physical resource corresponding to the device drive. In some embodiments, the virtualization manager 325 may access one or more virtual device drivers on the hardware unit 315. Each virtual device driver may specify the associated virtual resources for emulating the virtual machine 335 on the hardware unit 315, such as the processor, the memory, the storage, and the network resources, among others.

Having determined the supported virtualization modes and/or the hardware settings, the virtualization manager 325 may provide a graphical user interface for configuring the virtual machine 335. The virtualization manager 325 may send an application including the graphical user interface for configuration the virtual machine 335 to the client 310. The graphical user interface may include a set of types of operating systems, a set of virtualization modes for each type of operating system, and/or a set of hardware settings to run virtual machines using the type of operating system in accordance with the virtualization mode, among others. The graphical user interface may include any number of interface elements for selecting among the set of operating systems, the set of virtualization modes, the set of virtualization modes, and/or the set of hardware settings. Once received by the client 310, the client 310 may present for display the application including the graphical user interface for selection by the end user in configuring the virtual machine 335.

In some embodiments, the graphical user interface may be for selecting one of the types of operating systems detected in the installation media 330 of the hardware units 315. The graphical user interface may include types of operating systems detected from at least one of the installation media 330 of the hardware units 315. The graphical user interface may also include types of operating systems not detected on or supported by any of the installation media 330 of the hardware units. The graphical user interface may include an indication as to which types of operating systems are supported or not supported. In some embodiments, the graphical user interface may exclude the types of operating systems not supported by the installation media 330. Upon interaction by the client 310 with one of the types of operating systems, the virtualization manager 325 may receive the selection of the type of operating system from the client 310 via the graphical user interface.

In some embodiments, the graphical user interface may be for selecting one of the virtualization modes to run the virtual machine 335 using the type of operating system. The graphical user interface may include virtualization modes supported for type of operating system detected from the installation media 330. The graphical user interface may also include virtualization modes not supported for the type of operating system detected from the installation media 330. The graphical user interface may include an indication as to which virtualization modes are supported or not supported for the type of operating system. In some embodiments, the graphical user interface may exclude the virtualization modes not supported by the type of operating system. In some embodiments, the graphical user interface may present the set of supported virtualization modes in response to the selection of one of the types of operating systems. Upon interaction by the client 310 with one of the virtualization modes for the type of operating system, the virtualization manager 325 may receive the selection of the virtualization mode from the client 310 via the graphical user interface.

In some embodiments, the graphical user interface may be for selecting one of the hardware settings to run the virtual machine 335 using the type of operating system in accordance with the virtualization mode. The graphical user interface may include an option to select minimal hardware settings for running the virtual machine 335 using the type of operating system in accordance with the virtualization mode. The graphical user interface may also include an option to select higher than minimum hardware settings for running the virtual machine 335 using the type of operating system in accordance with the virtualization mode. In some embodiments, the graphical user interface may include an option to select less than minimum hardware settings for running the virtual machine 335 using the type of operating system in accordance with the virtualization mode. The graphical user interface may include an indication as to which hardware settings are supported or not supported for the type of operating system. For example, the graphical user interface may display a prompt warning the end user of the client 310 that the selected hardware setting is not supported for running the virtual machine 335 with the selected operating system and the virtualization mode. In some embodiments, the graphical user interface may exclude hardware settings no supported for running the virtual machine 335 with the selected operating system and the virtualization mode. In some embodiments, the graphical user interface may present the set of supported hardware settings in response to the selection of one of the types of operating systems and the selection of one of the virtualization modes. Upon interaction by the client 310 with one of the hardware settings, the virtualization manager 325 may receive the selection of the hardware setting from the client 310 via the graphical user interface.

With the selection of the type of operating system, the virtualization mode, and/or the hardware settings, the virtualization manager 325 may create the virtual machine 335 based on the type of operating system in accordance with the virtualization mode using the hardware settings. From the selection, the virtualization manager 325 may identify the selected type of operating system, the selected virtualization mode for the type of operating system, and/or the selected hardware setting for running the virtual machine 335 with the selected type of operating system in accordance with the selected virtualization mode.

The virtualization manager 325 may determine whether the selection of the type of operating system, virtualization mode, hardware setting from the graphical user interface is compatible. In some embodiments, the virtualization manager 325 may compare the selected type of operating system with the types of operating systems detected from the installation media 330 across one or more of the hardware units 315. If the selected type of operating system does not match any of the detected types of operating systems, the virtualization manager 325 may determine that the selected type of operating system is incompatible. On the other hand, if the selected type of operating system matches at least one of the detected types of operating systems, the virtualization manager 325 may determine that the selected type of operating system is compatible.

If the type of operating system selected is determined to be compatible, the virtualization manager 325 may compare the selected virtualization mode to the virtualization modes determined to be supported by the type of operating system. If the selected virtualization mode does not match any of the virtualization modes determined to be supported by the type of operating system, the virtualization manager 325 may determine that the selected virtualization mode is incompatible. On the other hand, if the selected virtualization mode matches at least one of the virtualization modes determined to be supported by the type of operating system, the virtualization manager 325 may determine that the selected virtualization mode is compatible.

If the virtualization mode selected is determined to be compatible, the virtualization manager 325 may compare the selected hardware settings to the hardware settings determined for running the virtual machine 330 with the type of operating system in accordance with the virtualization mode. In some embodiments, the virtualization manager 325 may identify the hardware settings for the hardware unit 315 with the installation media 330 including the selected type of operating system available for running the virtual machine 335 in accordance with the virtualization mode. The virtualization manager 325 may compare the hardware settings for the hardware unit 315 corresponding the selected type of operating system available for running the virtual machine 335 in accordance with the virtualization mode with the selected hardware settings. If any one of the selected hardware settings is greater than the hardware settings available on the hardware unit 315 for running the virtual machine 335, the virtualization manager 325 may determine that the selected virtualization mode is incompatible. On the other hand, if the selected hardware settings are all less than or equal to the hardware settings available on the hardware unit 315 for running the virtual machine 335, the virtualization manager 325 may determine that the selected virtualization mode is compatible.

Once all the selections of the type of operating system, the virtualization mode, and/or the hardware settings are determined to be compatible, the virtualization manager 325 may create virtual machine 335. The virtual machine 335 may be configured based on the selected type of operating system in accordance with the selected virtualization mode with the selected hardware settings. The virtualization manager 325 may allocate resources of the hardware unit 315 corresponding to the selected hardware setting to create and run the virtual machine 335. In some embodiments, the virtualization manager 325 may mount the installation media 330 with the selected type of operating system onto the hardware unit 315 to create the virtual machine 335. Once mounted, the virtualization manager 325 may instantiate the virtual machine 335 using the operating system on the installation media 330 in accordance with the virtualization mode.

Conversely, if any of the selections of the type of operating system, the virtualization mode, and/or the hardware settings are determined to be incompatible, the virtualization manager 325 may provide a prompt on the graphical user interface to the client 310 indicating incompatibility. The prompt may indicate that the requested virtual resource is unavailable, unsupported, or otherwise incompatible. In some embodiments, the virtualization manager 325 may send the selection of the type of operating system, the virtualization mode, and/or the hardware settings to a separate virtualization service to create, run, or otherwise establish a virtual machine. The virtualization service may be a separate virtualization environment (e.g., the virtualization environment 200) with other virtual and physical resources that can establish the virtual machine. In some embodiments, the virtualization manager 325 may identify one or more default options running the virtual machine 335. In some embodiments, the default options may include a pre-specified type of operating system, a pre-specified virtualization mode for the pre-specified type of operating system, and a pre-specified hardware setting for the hardware unit 315 to run the virtual machine 335 based on the pre-specified type of operating system in accordance with the pre-specified virtualization mode. The default options may be selected for compatibility with the installation media 330 and the types of operating systems detected on the installation media 330 of the hardware units 315 accessible from the virtual machine configuration system 305. In some embodiments, the default options may be any one of the types of operating systems detected on the installation media 330, the one or more virtualization modes determined for the types of operating systems, and/or the hardware settings for the virtual machine 335 based on the type of operating system in accordance with the virtualization mode.

The virtualization manager 325 may also automatically create the virtual machine 335 without receipt of the selection from the graphical user interface presented at the client 310. In creating the virtual machine 335 in accordance with the virtualization mode, the virtualization manager 325 may mount the installation media 330 corresponding to the type of operating system onto the hardware unit 315. Once mounted, the virtualization manager 325 may instantiate the virtual machine 335 using the operating system on the installation media 330 in accordance with the virtualization mode. In some embodiments, the virtualization manager 325 may select any of the types of operating systems detected on the installation media 330, the one or more virtualization modes determined for the types of operating systems, and/or the hardware settings for the virtual machine 335 based on the type of operating system in accordance with the virtualization mode. In some embodiments, the virtualization manager 325 may create the virtual machine 335 with the type of operating system detected from the installation media 330 in accordance with one of virtualization modes determined for the type of operating system. In some embodiments, the virtualization manager 325 may allocate resources of the hardware unit 315 corresponding to the determined hardware setting to create and run the virtual machine 335.

Figure 3B:
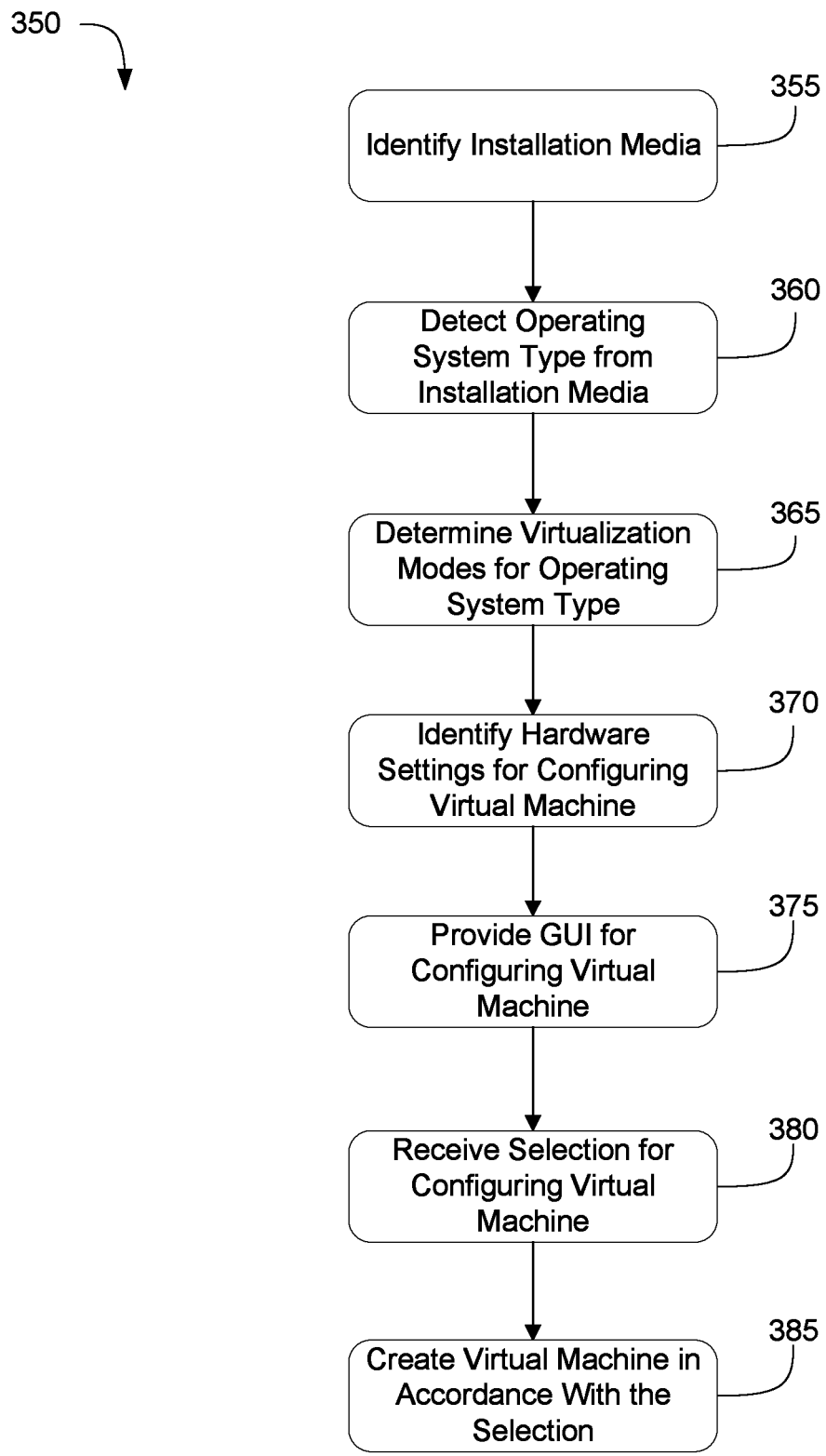
FIG. 3B is a flow diagram of an embodiment of a method of running virtual machines by probing installation media.

Referring now to FIG. 3B, depicted is a flow diagram of an embodiment of a method 350 of running virtual machines by probing installation media. The operations and functionalities of the method 350 may be performed by the components described in FIG. 1, FIG. 2, and FIG. 3A, such as the virtualized environment 200 or the system 300 detailed above. In brief overview, a media probe may identify installation media (355). The media probe may detect an operating system type from the installation media (360). A virtualization manager may determine virtualization modes for the operating system type (365). The virtualization manager may identify hardware settings for configuring the virtual machine (370). The virtualization manager may provide a graphical user interface for configuring a virtual machine to a client (375). The virtualization manager may receive selections for configuring the virtual machine from the graphical user interface from the client (380). The virtualization manager may create a virtual machine in accordance with the selected virtualization mode and hardware settings (385).

In further detail, a media probe may identify installation media (355). The installation media may reside on a storage of a hardware unit and may include setup data for installing an operating system for configuring the virtual machine. The media probe may access the storage of hardware unit to identify one or more files corresponding to the installation media. In some embodiments, the media probe may traverse through all the files on storage to search for the subset of files corresponding to the installation media. In some embodiments, the media probe may find the set of installation files at a predefined location.

The media probe may detect an operating system type from the installation media (360). The operating system type may include any version of Microsoft Windows™, any type of Linux™ distribution, and Macintosh™ operating systems (e.g., macOS™), among others. In some embodiments, the media probe may extract setup metadata from the one or more files corresponding to the installation media. By parsing the extracted setup metadata, the media probe may identify the type of operating system within the installation media. In some embodiments, the media probe may execute a command to retrieve the type of operating system for the installation media.

A virtualization manager may determine virtualization modes for the operating system type (365). The virtualization modes for the operating system type may include a full-virtualization mode (also referred to as hardware-assisted virtualization or hardware virtualized machine (HVM)), a para-virtualization mode (also referred to as para-virtualized machine (PVM)), or a hybrid mode (a hardware virtualization machine with para-virtualization drivers (PVHVM)), among others. In some embodiments, the virtualization manager may identify one or more capabilities of the operating system type detected from the installation media. Each capability may rely on full-virtualization or para-virtualization. Based on whether the capabilities depend on full-virtualization or para-virtualization, the virtualization manager may determine the virtualization mode for the operating system type.

The virtualization manager may identify hardware settings for configuring the virtual machine (370). The hardware settings may specify physical resources to be allocated in creating, running, and configuring the virtual machine, such as processor, memory, storage, and network resources. In some embodiments, the virtualization manager may access a list of hardware settings for running virtual machines based on the operating system type in accordance with the virtualization mode. The list may specify minimum hardware settings and recommended hardware settings for running the virtual machines based on the operating system type in accordance with the virtualization mode.

The virtualization manager may provide a graphical user interface for configuring a virtual machine to a client (375). The graphical user interface may include a set of types of operating systems, a set of virtualization modes for each type of operating system, and/or a set of hardware settings to run virtual machines using the type of operating system in accordance with the virtualization mode, among others. In some embodiments, the virtualization manager may send an application to display the graphical user interface to the client. Upon receipt, the client may present the graphical user interface for selection of the type of operating system, virtualization mode, and the hardware settings on a display for selection by the end user.

The virtualization manager may receive selections for configuring the virtual machine from the graphical user interface from the client (380). Upon interaction with the graphical user interface, the client may send the selection to the virtualization manager. The selection may include a selected type of operating systems, a selected virtualization mode for the selected type of operating system, and/or the selected hardware settings to run the virtual machine using the selected type of operating system in accordance with the selected virtualization mode, among others. In some embodiments, the virtualization manager may determine whether the selection is compatible.

The virtualization manager may create the virtual machine in accordance with the selection (385). In some embodiments, the virtualization manager may create the virtual machine as selected from the graphical user interface, in response to receipt of the selection from the client. In some embodiments, the virtualization manager may automatically create the virtual machine without any selection. In creating the virtual machine, the virtualization manager may mount the installation media with the type of operating system. Once mounted, the virtualization manager may instantiate the virtual machine using the operating system on the installation media in accordance with the virtualization mode. The virtualization manager may also allocate physical resources corresponding to the hardware settings in creating, running, and configuring the virtual machine.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of running virtual machines by probing installation media, comprising:
    identifying, by a media probe executing on one or more processors, an installation media for creating a virtual machine on a host server;
    detecting, by the media probe from metadata contained within one or more files of the installation media, a type of operating system to be used by the virtual machine on the host server;
    determining, by a virtualization manager executing on the one or more processors, from a plurality of virtualization modes comprising at least one of a full virtualization mode, a para-virtualization mode, or a hybrid virtualization mode, a subset of virtualization modes that are supported by the type of operating system detected from the metadata contained within the one or more files of the installation media prior to creating the virtual machine on the host server;
    providing, by the virtualization manager, a first graphical user interface for selecting one of the plurality of virtualization modes, the plurality of virtualization modes including a first virtualization mode supported by the type of operating system and a second virtualization mode not supported by the type of operating system detected from the installation media;
    receiving, by the virtualization manager from the first graphical user interface, a selection of the first virtualization mode to be used to configure the virtual machine;
    identifying, by the virtualization manager, a minimum hardware setting for configuration of the virtual machine in accordance with the first virtualization mode;
    providing, by the virtualization manager, a second graphical user interface for selecting one of a plurality of hardware settings for configuration of the virtual machines, the plurality of hardware settings including a first setting corresponding to the minimum hardware setting and a second setting greater than the minimum hardware setting;
    receiving, by the virtualization manager from the second graphical user interface, a selection of a hardware setting of the plurality of hardware settings to be used to configure the virtual machine; and
    creating, by the virtualization manager on the host server, the virtual machine in accordance with the first virtualization mode selected from the plurality of virtualization modes and supported by the type of operating system and the hardware setting selected from the plurality of hardware settings.

2. The method of claim 1, wherein identifying the installation media further comprises identifying a disk image file corresponding to the installation media; and
    wherein detecting the type of operating system further comprises retrieving the metadata specifying the type of operating system from the disk image file.

3. The method of claim 1, wherein identifying the installation media further comprises identifying a release package including the installation media; and
    wherein detecting the type of operating system further comprises finding an operating system identification file in the release package, the operating system identification file specifying the type of operating system for the release package.

4. The method of claim 1, wherein creating the virtual machine further comprises mounting the installation media for the virtual machine in accordance with the first virtualization mode determined based on the type of operating system.

5. The method of claim 1, further comprising:
    identifying, by the virtualization manager, a minimum hardware setting for configuration of the virtual machine in accordance with the first virtualization mode based on the type of operating system; and
    wherein creating the virtual machine further comprises creating the virtual machine in accordance with the first virtualization mode using at least the minimum hardware setting.

6. The method of claim 1, further comprising
    providing, by the virtualization manager, the first graphical user interface for selecting one of the subset of virtualization modes; and
    receiving, by the virtualization manager from the first graphical user interface, the selection of the first virtualization mode to be used to configure the virtual machine, and
    wherein creating the virtual machine further comprises creating the virtual machine in accordance with the first virtualization mode selected from the subset of virtualization modes via the graphical user interface.

7. The method of claim 1, further comprising:
    providing, by the virtualization manager, the first graphical user interface for selecting one of the plurality of virtualization modes, the plurality of virtualization modes including the first virtualization mode supported by the type of operating system and a second virtualization mode not supported by the type of operating system detected from the installation media;

receiving, by the virtualization manager, a selection of the second virtualization mode from the first graphical user interface; and sending, by the virtualization manager, the selection of the second virtualization mode to a virtualization service to establish a second virtual machine separate from the first virtual machine.

8. A system for running virtual machines by probing installation media, comprising:

a device having one or more processors coupled with memory, configured to:

identify an installation media for creating a virtual machine on a host server;

detect, from metadata contained within one or more files of the installation media, a type of operating system to be used by the virtual machine on the host server;

determine, from a plurality of virtualization modes including at least one of a full virtualization mode, a para-virtualization mode, or a hybrid virtualization mode, a subset of virtualization modes that are supported by the type of operating system detected from the metadata contained within the one or more files of the installation media prior to creating the virtual machine on the host server;

provide a first graphical user interface for selecting one of the plurality of virtualization modes, the plurality of virtualization modes including a first virtualization mode supported by the type of operating system and a second virtualization mode not supported by the type of operating system detected from the installation media;

receive, from the first graphical user interface, a selection of the first virtualization mode to be used to configure the virtual machine;

identify a minimum hardware setting for configuration of the virtual machine in accordance with the first virtualization mode;

provide a second graphical user interface for selecting one of a plurality of hardware settings for configuration of the virtual machines, the plurality of hardware settings including a first setting corresponding to the minimum hardware setting and a second setting greater than the minimum hardware setting;

receive, from the second graphical user interface, a selection of a hardware setting of the plurality of hardware settings to be used to configure the virtual machine; and create, on the host server, the virtual machine in accordance with the first virtualization mode selected from the plurality of virtualization modes and determined and supported by the type of operating system and the hardware setting selected from the plurality of hardware settings.

9. The system of claim 8, wherein the device is configured to:

identify the installation media by identifying a disk image file corresponding to the installation media; and detect the type of operating system by retrieving the metadata specifying the type of operating system from the disk image file.

10. The system of claim 8, wherein the device is configured to:

identify the installation media by identifying a release package including the installation media; and detect the type of operating system by finding an operating system identification file in the release package, the operating system identification file specifying the type of operating system for the release package.

11. The system of claim 8, wherein the device is further configured to create the virtual machine by mounting installation media for the virtual machine in accordance with the first virtualization mode determined based on the type of operating system.

12. The system of claim 8, wherein the device is further configured to:

identify a minimum hardware setting for configuration of the virtual machine in accordance with the first virtualization mode based on the type of operating system; and create the virtual machine in accordance with the first virtualization mode using at least the minimum hardware setting.

13. The system of claim 8, wherein the device is further configured to:

provide the first graphical user interface for selecting one of the subset of virtualization modes;

receive, from the graphical user interface, the selection of the first virtualization mode to be used to configure the virtual machine; and create the virtual machine in accordance with the first virtualization mode selected from the subset of virtualization modes via the graphical user interface.

14. The system of claim 8, wherein the device is configured to:

provide the first graphical user interface for selecting one of the plurality of virtualization modes, the plurality of virtualization modes including the first virtualization mode supported by the type of operating system and the second virtualization mode not supporting the type of operating system detected from the installation media;

receive a selection of the second virtualization mode from the first graphical user interface; and send the selection of the second virtualization mode to a virtualization service to establish a second virtual machine separate from the first virtual machine.

* * * * *